United States Patent
Chu et al.

(10) Patent No.: US 11,145,246 B2
(45) Date of Patent: Oct. 12, 2021

(54) FIELD RECALIBRATION OF DISPLAYS

(71) Applicant: SYNAPTICS INCORPORATED, San Jose, CA (US)

(72) Inventors: Xi Chu, Fremont, CA (US); Joseph Kurth Reynolds, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 16/551,127

(22) Filed: Aug. 26, 2019

(65) Prior Publication Data

US 2021/0065622 A1   Mar. 4, 2021

(51) Int. Cl.
*G06F 3/041* (2006.01)
*G09G 3/3225* (2016.01)
*G06F 3/044* (2006.01)

(52) U.S. Cl.
CPC ........... *G09G 3/3225* (2013.01); *G06F 3/044* (2013.01); *G06F 3/0412* (2013.01); *G09G 2320/04* (2013.01); *G09G 2320/0693* (2013.01)

(58) Field of Classification Search
CPC ............ G09G 3/3225; G09G 2320/04; G09G 2320/0693; G09G 3/3611; G09G 3/006; G06F 3/0412; G06F 3/044
See application file for complete search history.

(56) References Cited

U.S. PATENT DOCUMENTS

| | | | | |
|---|---|---|---|---|
| 2008/0284794 | A1* | 11/2008 | Wang | G09G 3/3688 345/618 |
| 2010/0013751 | A1* | 1/2010 | Kerofsky | G09G 3/3611 345/89 |
| 2018/0075802 | A1* | 3/2018 | Liu | G09G 3/3233 |
| 2018/0107069 | A1* | 4/2018 | Lee | G02F 1/1368 |
| 2018/0144719 | A1* | 5/2018 | Lee | G09G 3/006 |
| 2018/0322834 | A1* | 11/2018 | Zhang | G09G 3/2007 |
| 2019/0197678 | A1* | 6/2019 | Lu | G02F 1/1309 |
| 2020/0090625 | A1* | 3/2020 | Yoo | G09G 5/10 |

OTHER PUBLICATIONS http://allaboutwindowsphone.com/features/item/20372_Do_AMOLED_phone_screens_degrad.php. AAWP, Do AMOLED phone screens degrade over time? Yes, proof time, but . . . Published by Steve Litchfield, Jan. 4, 2015.
Takatoshi Tsujimura, "OLED Display Fundamentals and Applications", 2nd ed., published Mar. 4, 2017, p. 99. <https://onlinelibrary.wiley.com/doi/book/10.1002/9781119187493> <https://books.google.com/books?id=09hCDgAAQBAJ&pg=PP99>.

* cited by examiner

*Primary Examiner* — Towfiq Elahi
(74) *Attorney, Agent, or Firm* — Ferguson Braswell Fraser Kubasta PC (57) ABSTRACT

Aspects described herein include a method and associated processing system for a display having a plurality of pixels. The method comprises driving, using display circuitry, a plurality of pixels of a display device to display one or more test patterns. The display device is integrated into a manufactured input device. The method further comprises receiving field-set mura compensation data that is based on one or more images of the plurality of pixels. The one or more images are acquired responsive to displaying the one or more test patterns. The method further comprises writing the field-set mura compensation data to a memory of the input device. The field-set mura compensation data replaces or is stored along with factory-set mura compensation data.

20 Claims, 6 Drawing Sheets

FIELD RECALIBRATION OF DISPLAYS

BACKGROUND

Field

Embodiments disclosed herein generally relate to electronic devices, and more specifically, techniques for field recalibration of displays.

Description of the Related Art

Input devices including proximity sensor devices may be used in a variety of electronic systems. A proximity sensor device may include a sensing region, demarked by a surface, in which the proximity sensor device determines the presence, location, force and/or motion of one or more input objects. Proximity sensor and display devices may be used to provide interfaces for the electronic system. For example, proximity sensor devices may be used as input devices for larger computing systems, such as touchpads integrated in, or peripheral to, notebook or desktop computers with displays. Proximity sensor devices may also often be used in smaller computing systems, such as touch screens integrated in cellular phones. Additionally, proximity sensor devices may be implemented as part of a multi-media entertainment touch screen system of an automobile.

SUMMARY

One embodiment described herein is a processing system for a display having a plurality of pixels. The processing system comprises a non-volatile memory configured to store factory-set mura compensation data for the display. The processing system further comprises display driver circuitry configured to drive the plurality of pixels to display one or more test patterns, and write field-set mura compensation data into the non-volatile memory. The field-set mura compensation data is based on one or more images of the plurality of pixels that are acquired responsive to displaying the one or more test patterns. The display driver circuitry is further configured to drive the plurality of pixels to display an image using the field-set mura compensation data instead of using the factory-set mura compensation data.

Another embodiment described herein is a method comprising driving, using display circuitry, a plurality of pixels of a display device to display one or more test patterns. The display device is integrated into a manufactured input device. The method further comprises receiving field-set mura compensation data that is based on one or more images of the plurality of pixels. The one or more images are acquired responsive to displaying the one or more test patterns. The method further comprises writing the field-set mura compensation data to a memory of the input device. The field-set mura compensation data replaces or is stored along with factory-set mura compensation data.

Another embodiment described herein is a method comprising acquiring, using a visual sensor, one or more images of a display device that is integrated into a manufactured input device. The display device drives a plurality of pixels to display one or more test patterns. The method further comprises generating field-set mura compensation data that is based on the acquired one or more images, and transmitting the field-set mura compensation data to the input device.

Another embodiment described herein is a method comprising acquiring, using a visual sensor, one or more images of a display device that is integrated into a manufactured input device. The display device drives a plurality of pixels to display one or more test patterns. The method further comprises reading out the factory-set mura compensation data and acquiring the display test pattern images while initial mura compensation is active. The method further comprises generating field-set mura compensation data that is based on both the acquired one or more images in addition to the factory-set mura compensation data, and transmitting the field-set mura compensation data to the input device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

Figure 1:
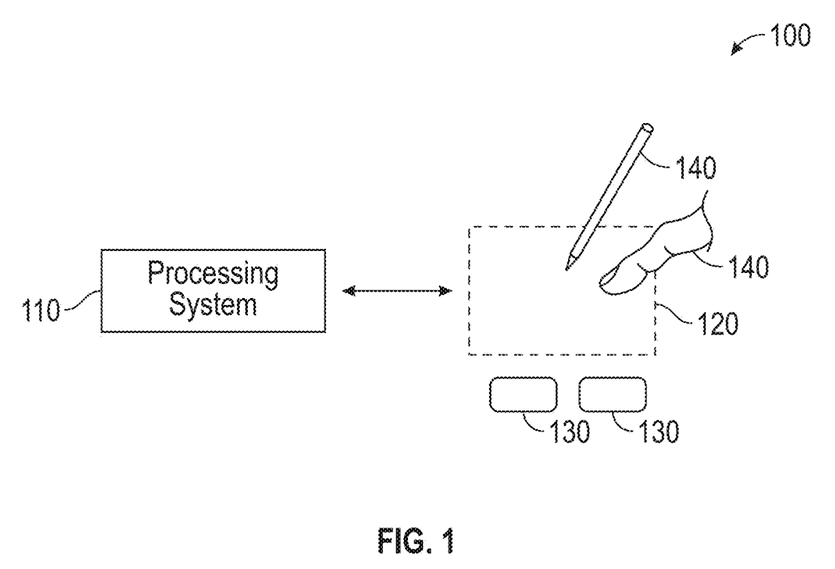
FIG. 1 is a schematic block diagram of an input device, according to embodiments described herein.

An example input device 100 as shown in FIG. 1 in accordance with embodiments of the disclosure may be configured to provide input to an electronic system. As used in this document, the term "electronic system" broadly refers to any system capable of electronically processing information. Some non-limiting examples of electronic systems include personal computers of all sizes and shapes, such as desktop computers, laptop computers, netbook computers, tablets, web browsers, e-book readers, personal digital assistants (PDAs) and multi-media entertainment devices of automobiles. Additional example electronic systems include composite input devices, such as physical keyboards that include input device 100 and separate joysticks or key switches. Further example electronic systems include peripherals such as data input devices, e.g., remote controllers and mice, and data output devices, e.g., display screens and printers. Other examples include remote terminals, kiosks, video game machines, e.g., video game consoles, portable gaming devices, multi-media entertainment devices of an automobile, and the like. Other examples include communication devices, e.g., cellular phones such as smart phones, and media devices, e.g., recorders, editors, and players such as televisions, set-top boxes, music players, digital photo frames, and digital cameras. Additionally, the electronic system could be a host or a slave to the input device. The electronic system may also be referred to as electronic device.

The input device 100 can be implemented as a physical part of the electronic system, or can be physically separate from the electronic system. In one embodiment, the electronic system may be referred to as a host device. As appropriate, the input device 100 may communicate with parts of the electronic system using any one or more of the following: buses, networks, and other wired or wireless interconnections. Examples include I²C, SPI, PS/2, Universal Serial Bus (USB), MIPI, DisplayPort, Bluetooth, RF, and IrDA.

In FIG. 1, the input device 100 is shown as a proximity sensor device configured to sense input provided by one or more input objects 140 in a sensing region 120. Example input objects 140 include fingers and styli, as shown in FIG. 1. An exemplary proximity sensor device may be a touchpad, a touch screen, a touch sensor device and the like.

The sensing region 120 encompasses any space above, around, in and/or near the input device 100 in which the input device 100 is able to detect user input, e.g., user input provided by one or more input objects 140. The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiment's sense input that comprises: no contact with any surfaces of the input device 100; contact with an input surface, e.g., a touch surface, of the input device 100: contact with an input surface of the input device 100 coupled with some amount of applied force or pressure; and/or a combination thereof. In various embodiments, input surfaces may be provided by surfaces of casings within which the sensor electrodes (also referred to herein as sensing electrodes) reside, by face sheets applied over the sensor electrodes or any casings, etc. In some embodiments, the sensing region 120 has a rectangular shape when projected onto an input surface of the input device 100. An input object that is not in contact with any surfaces of the input device 100 may be referred to as a hovering input object.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images (e.g., of capacitive signals) that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self-capacitance" (also often referred to as "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage, e.g., system ground, and by detecting the capacitive coupling between the sensor electrodes and input objects. In some implementations sensing elements may be formed of a substantially transparent metal mesh (e.g., a reflective or absorbing metallic film patterned to minimize visible transmission loss from the display sub-pixels). Further, the sensor electrodes may be disposed over a display of a display device. The sensing electrodes may be formed on a common substrate of a display device (e.g., on the encapsulation layer of a rigid or flexible organic light emitting diode (OLED) display). An additional dielectric layer with vias for a jumper layer may also be formed of a substantially transparent metal mesh material (e.g., between the user input and an OLED cathode). The jumpers of the jumper layer may be coupled to the electrodes of a first group and cross over sensor electrodes of a second group. Alternately, the electrodes may be coupled to a sensor IC in a single layer without requiring jumpers in the display active area.

Some capacitive implementations utilize "mutual capacitance" (also often referred to as "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also referred to herein as "transmitter electrodes" or "transmitters") and one or more receiver sensor electrodes (also referred to herein as "receiver electrodes" or "receivers"). The coupling may be reduced when an input object coupled to a system ground approaches the sensor electrodes. Transmitter sensor electrodes may be modulated relative to a reference voltage, e.g., system ground, to transmit transcapacitive sensing signals. Receiver sensor electrodes may be held substantially constant relative to the reference voltage or modulated relative to the transmitter sensor electrodes to facilitate receipt of resulting signals. A resulting signal may comprise effect(s) corresponding to one or more transcapacitive sensing signals, and/or to one or more sources of environmental interference, e.g., other electromagnetic signals. Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) chips and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In another example, a sensor may be configured to receive current or charge from one or more optical sensing elements (e.g., a photodiode or a phototransistor) coupled to the sensing electrodes (e.g., through a thin film transistor switch in the display active area). In an alternate example, the one or more optical sensing elements are not coupled with the sensing electrodes. Specific areas of the display may be illuminated brightly to locally aid the optical sensing data acquired using the optical sensing element(s) in those areas. In some embodiments, the optical sensing data may be used to acquire biometric information such as a fingerprint of a user touching the sensor.

In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (in another embodiment, with associated firmware) separate from the central processing unit. As another example, the input device 100 may be physically integrated in a phone, and the processing system 110 may comprise circuits and firmware that are part of a main processor (e.g., a mobile device application processor or any other central processing unit) of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used.

In some embodiments, the processing system 110 responds to user input (or lack of user input) in the sensing region 120 directly by causing one or more actions. Example actions include changing operation modes such as unlocking secure operation, as well as GUI actions such as cursor movement, selection, menu navigation, and other functions.

In some embodiments, the processing system 110 provides information about the input (or lack of input) to some part of the electronic system, e.g., to a central processing system of the electronic system that is separate from the processing system 110, if such a separate central processing system exists. In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. The filtering may comprise one or more of demodulating, sampling, weighting, and accumulating of analog or digitally converted signals (e.g., for FIR digital or IIR switched capacitor filtering) at appropriate sensing times. The sensing times may be relative to the display output periods (e.g., display line update periods or blanking periods). As yet another example, the processing system 110 may subtract or otherwise account for a baseline, such that the information reflects a difference between the electrical signals from user input and the baseline signals. A baseline may account for display update signals (e.g., subpixel data signal, gate select and deselect signal, or emission control signal) which are spatially filtered (e.g., demodulated and accumulated) and removed from the lower spatial frequency sensing baseline. Further, a baseline may compensate for a capacitive coupling between the sensor electrodes and one or more nearby electrodes. The nearby electrodes may be display electrodes, dummy sensor electrodes, and or other conductive objects that may be capacitively coupled with the sensor electrodes. Additionally, the baseline may be compensated for using digital or analog means. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of a display screen. For example, the sensing region 120 may overlap at least a portion of an active area of a display screen (or display panel). The active area of the display panel may correspond to a portion of the display panel where images are updated. In one or more embodiments, the input device 100 may comprise substantially transparent sensor electrodes overlaying the display screen and provide a touch screen interface for the associated electronic system. The display panel may be any type of dynamic display capable of displaying a visual interface to a user, and may include any type of light emitting diode (LED), OLED, cathode ray tube (CRT), liquid crystal display (LCD), plasma, electroluminescence (EL), or other display technology. The input device 100 and the display panel may share physical elements. For example, some embodiments may utilize some of the same electrical components for displaying and sensing. As another example, the display panel may be operated in part or in total by the processing system 110.

It should be understood that while many embodiments of the disclosure are described in the context of a fully functioning apparatus, the mechanisms of the present disclosure are capable of being distributed as a program product, e.g., software, in a variety of forms. For example, the mechanisms of the present disclosure may be implemented and distributed as a software program on information bearing media that are readable by electronic processors, e.g., non-transitory computer-readable and/or recordable/writable information bearing media readable by the processing system 110. Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
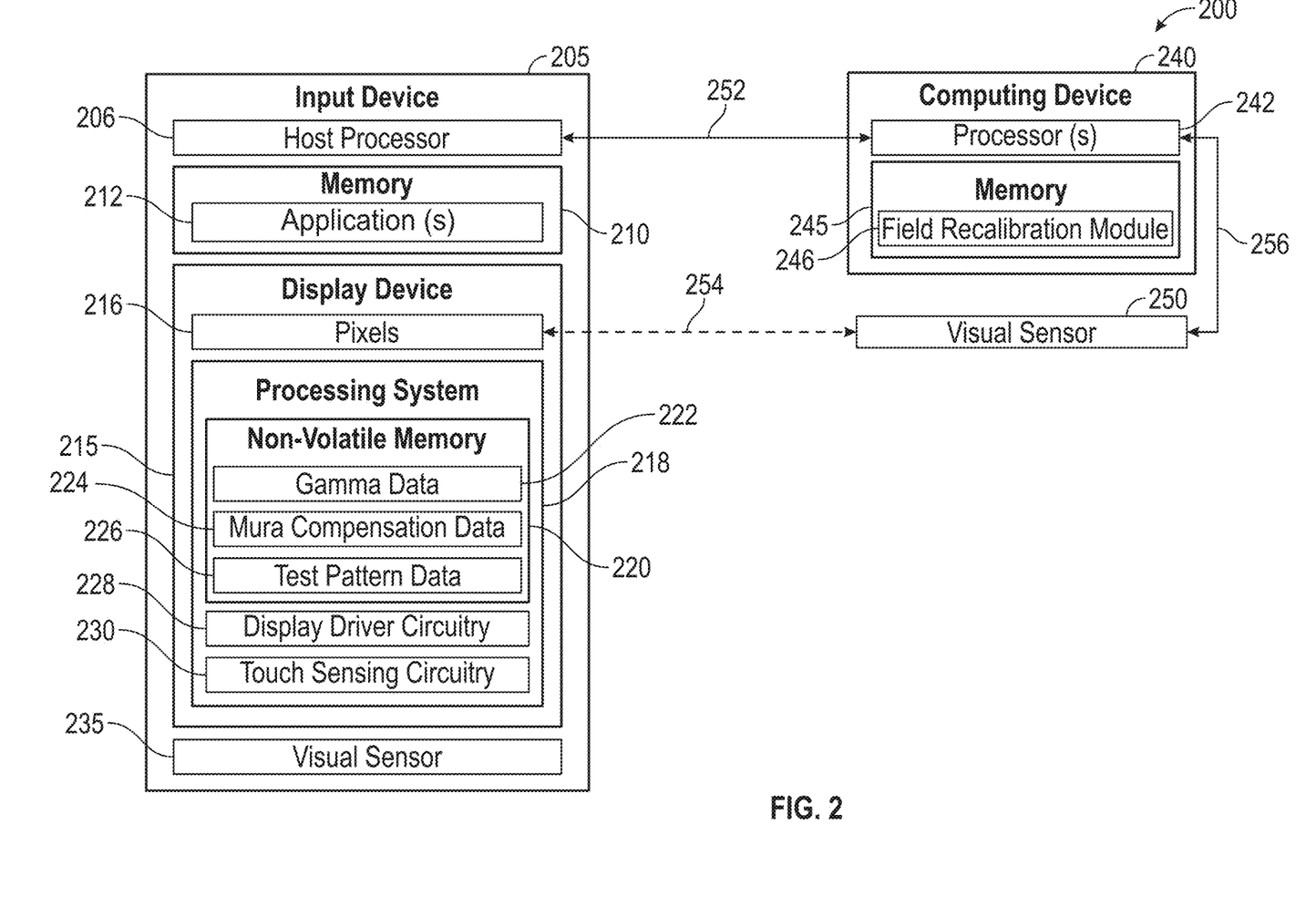
FIG. 2 is a block diagram of an exemplary system for field calibration of a display device, according to embodiments described herein.

FIG. 2 is a block diagram of an exemplary system 200 for field calibration of a display device, according to embodiments described herein. The features depicted in FIG. 2 may be used in conjunction with other embodiments. For example, the input device 205 of Figure may be an example of the input device 100 of FIG. 1.

The input device 205 may have any suitable implementation. Some non-limiting examples of the input device 205 include mobile computing devices (e.g., handheld or body-worn computing devices), personal computers (PCs), smart televisions or other smart displays, automotive infotainment systems, and so forth. The input device 205 receives user inputs using any suitable techniques, whether integrated into the input device 205 or external to the input device 205. For example, the input device 205 may include sensor electrodes for touch sensing (e.g., a trackpad or touch panel), buttons, sliders, balls, wheels, switches, keyboards, mice, joysticks, and so forth.

The input device 205 comprises a host processor 206 and a memory 210. The host processor 206 may be implemented in any suitable form, such as a general purpose microprocessor, a controller, an application-specific integrated circuit (ASIC), and so forth. The memory 210 may include a variety of computer-readable media selected for their size, relative performance, or other capabilities: volatile and/or non-volatile media, removable and/or non-removable media, etc.

The memory 210 may include one or more applications 212 for performing various functions described herein. In one embodiment, each application 212 includes program code that is executable by the host processor 206. However, other embodiments may have functionality that is partially or fully implemented in hardware (i.e., circuitry) or firmware of the input device 205. In some embodiments, the application 212 communicates with a field recalibration module 246 of the computing device 240 to perform field calibration of a display device 215 of the input device 205. In some embodiments, the application 212 includes some or all of the functionality of the field recalibration module 246 that is discussed in greater detail below.

The display device 215 may use any suitable display technology. Some non-limiting examples of the display device 215 include an OLED display, a plasma display, an LED display, and a microLED display. The display device 215 comprises a plurality of pixels 216 that are arranged according to any suitable color scheme. Some non-limiting examples of the plurality of pixels 216 include red, green, and blue (RGB) pixels, red, green, blue, and white (RGBW) pixels, and so forth. In some implementations, pixels may be referred to as sub-pixels that are combined to form full color pixels (e.g., controlling both chroma and luminance). Also, pixels may be combined to form larger groups for sub-pixel-rendering (SPR) such as Pentile (RGBG), Triad (RGB), or other combinations.

The display device 215 further comprises a processing system 218 that operates the plurality of pixels 216 to display desired imagery. The processing system 218 may be one example of the processing system 110 of FIG. 1. The processing system 218 comprises display driver circuitry 228 that operates the plurality of pixels, such as source drivers, gate drivers, and so forth. In some embodiments, the processing system 218 further comprises touch sensing circuitry 230 that operates a plurality of sensor electrodes, such as transmitters that drive the sensor electrodes with sensing signals, receivers that receive signals resulting from driving the sensing signals, other processing circuitry, and so forth. In some embodiments, the plurality of sensor electrodes comprises display electrodes that are coupled with the plurality of pixels 216 (e.g., common electrodes that are shared by multiple ones of the plurality of pixels 216).

For many types of the display device 215, a luminance non-uniformity (also referred to as "mura") among the plurality of pixels 216 can develop during the manufacturing process (e.g., due to material defects or process non-uniformities) and/or during the operational lifetime of the input device 205. For example, ghost images (or screen burn-in) may occur after extended periods of displaying static images on the display device 215, or repeatedly displaying very bright images in the same area. Some non-limiting examples of static images include user interface (UI) icons, a status bar, navigation buttons, and so forth. An example of a repeated bright image includes optical fingerprint sensor illumination. A user's interactions with the input device 205 can also impact the luminance of the plurality of pixels 216, e.g., by darkening, scratching, or otherwise disturbing a lens of the display device 215, by repeated folding or other manipulations causing mechanical stresses to the display device 215, and so forth.

Figure 3:
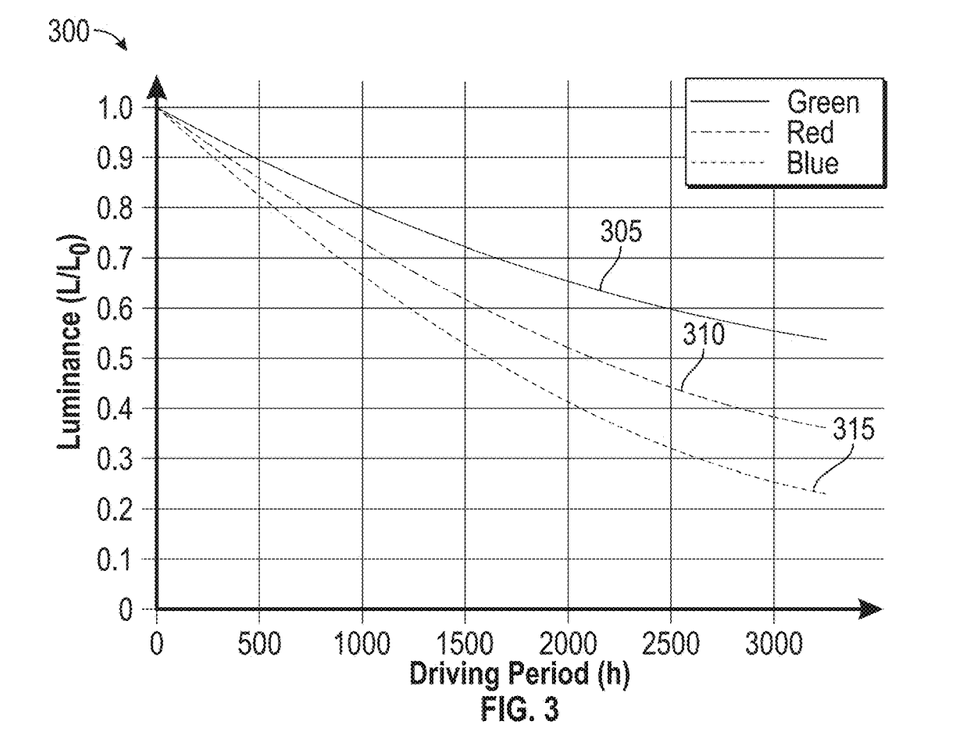
FIG. 3 is a graph illustrating degradation for pixel colors of a display device, according to embodiments described herein.

Further, the luminance non-uniformity can arise as materials used in the plurality of pixels 216 degrade differently over time. FIG. 3 is a graph 300 illustrating degradation for different pixel colors of the display device 215. More specifically, the graph 300 illustrates a normalized luminance ($L/L_0$) of the pixels relative to a driving period of the pixels in hours. While the graph 300 illustrates the normalized luminance for an OLED display, other display types may exhibit similar degradation characteristics.

Plot 305 illustrates a degradation of green pixels, plot 310 illustrates a degradation of red pixels, and plot 315 illustrates a degradation of blue pixels. As shown, the material(s) used in the red pixels degrade more quickly than that of the green pixels over time, and the material(s) used in the blue pixels degrade most quickly of all. The effect of the more rapid luminance reduction for the blue pixels can typically be observed in a color shift of the display device 215 over time, as a white color (displayed by driving the red pixels, green pixels, and blue pixels) becomes yellowed.

Figure 4:
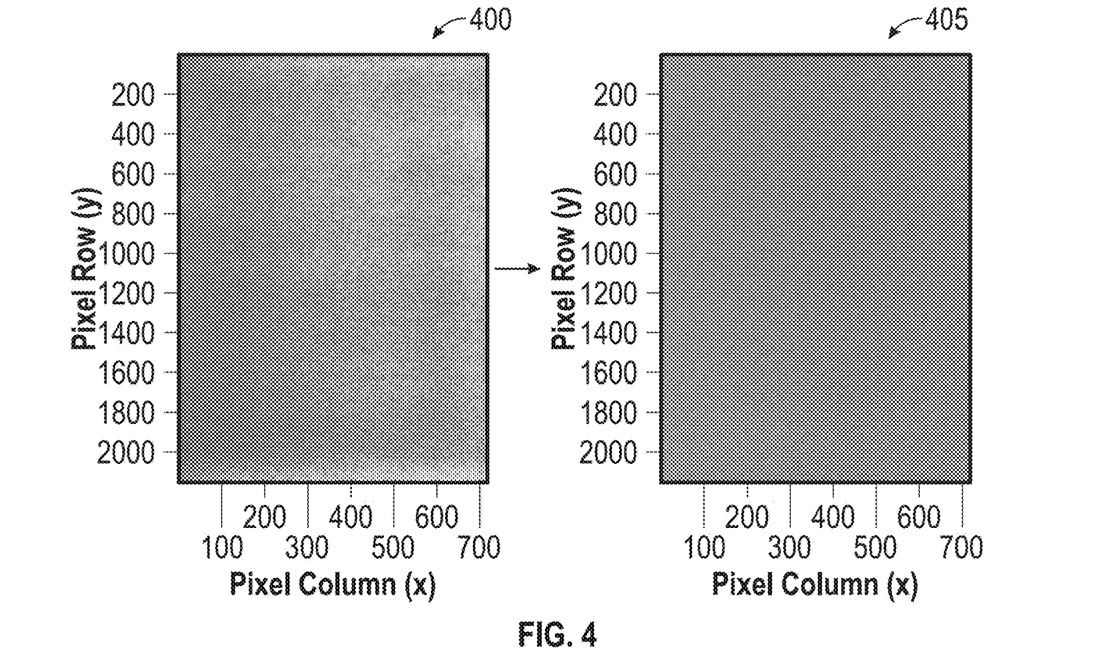
FIG. 4 includes graphs illustrating exemplary pixel luminance without and with applying mura compensation data, according to embodiments described herein.

To mitigate the luminance non-uniformity resulting from the manufacturing process, a factory-set mura compensation data may be written to a non-volatile memory (NVM) 220 of the processing system 218. FIG. 4 includes graphs 400, 405 illustrating exemplary pixel luminance without and with applying mura compensation data, respectively. While the graphs 400, 405 illustrate the luminance for green pixels of an OLED display, other display types may exhibit similar luminance characteristics. Notably, applying the mura compensation data results in a greater luminance uniformity in the graph 405.

However, the factory-set mura compensation data is inadequate to mitigate luminance non-uniformity that arises after the display device 215 is integrated into the input device 205 (e.g., during the operational lifetime of the manufactured input device 205). To address this inadequacy, in various embodiments described herein, field-set mura compensation data is generated and written into the NVM 220 using the system 200. In some cases, the field-set mura compensation data may be updated and written into the NVM 220 multiple times during the operational lifetime of the manufactured input device 205.

The NVM 220 may be implemented in any suitable form, such as a single, contiguous memory, multiple memories of one or more types, and so forth. In some embodiments, the NVM 220 stores gamma data 222 and mura compensation data 224, which the processing system 218 uses to provide a desired luminance for each of the plurality of pixels 216. The NVM 220 may store other display parameters. In some embodiments, the gamma data 222 comprises factory-set gamma data and the mura compensation data 224 comprises factory-set mura compensation data, which may be replaced by (or otherwise updated with) field-set gamma data and/or field-set mura compensation data during the operational lifetime of the input device 205.

In some embodiments, the NVM 220 stores test pattern data 226 that is used to display one or more test patterns using the plurality of pixels 216. The one or more test patterns may include repeating patterns and/or non-repeating patterns (e.g., a reference photo). For example, the test pattern data 226 may comprise a first, checkerboard (or other alternating line or square pattern) pattern that is used to locate the origin of the plurality of pixels 216, to determine an orientation of the display device 215, and/or to measure a pixel point spread function (PSF) during an initial calibration process. The test pattern data 226 may further comprise a set of uniform patterns (e.g., a single excitation code within a pattern) having different brightness levels (e.g., different colors or excitation codes between patterns), which are used to measure brightness gamma and uniformity of the display device. The test pattern data may further be optimized to maintain uniform spacing and/or similar luminance (e.g., all or an integer fraction of each color pixel to limit the required dynamic range of a visual sensor. The test pattern data 226 may be adjusted based on the presence of a protective film or glass attached to the display device 215 or any disturbance in the uniformity of the lens (e.g., caused by use).

In some embodiments, one or more images 254 of the plurality of pixels 216 are acquired responsive to displaying the one or more test patterns. The field-set gamma data and/or the field-set mura compensation data is generated based on the one or more images 254. In some embodiments, the one or more images are acquired using a visual sensor 250 that is external to the input device 205. In other embodiments, the one or more images are acquired using a visual sensor 235 that is included in the input device 205. The visual sensors 235, 250 may have any suitable implementation having a resolution sufficient to image the plurality of pixels 216.

The system 200 further comprises a computing device 240 comprising one or more processors 242 that are communicatively coupled with the visual sensor 250 via a communicative link 256. The one or more processors 242 are communicatively coupled with the host processor 206 of the input device 205 via a communicative link 252. Each of the communicative links 252, 256 may have any suitable implementation, which may be wire-based (e.g., Universal Serial Bus or other standardized or proprietary protocols such as MIPI or DisplayPort) or wireless (e.g., Wi-Fi, Bluetooth, or other standardized or proprietary protocols).

The computing device 240 may have any suitable implementation, such as a mobile computing device. In some embodiments, the computing device 240 is included as part of a workstation that is purposed for field recalibration of the display device 215. In other embodiments, the computing device 240 is a multi-purpose mobile computing device (e.g., a smartphone, tablet, laptop) usable by a technician or an end-user for field recalibration of the display device 215.

The computing device 240 comprises one or more processors 242 implemented in any suitable form, such as a general purpose microprocessor, a controller, an application-specific integrated circuit (ASIC), and so forth. The computing device 240 further comprises a memory 245, which may include a variety of computer-readable media selected for their size, relative performance, or other capabilities: volatile and/or non-volatile media, removable and/or non-removable media, etc.

The memory 245 may include one or more modules for performing various functions described herein. In one embodiment, each module includes program code that is executable by the one or more processors 242. However, other embodiments may have functionality that is partially or fully implemented in hardware (i.e., circuitry) or firmware of the computing device 240. As shown, the memory 245 comprises the field recalibration module 246.

In some embodiments, the field recalibration module 246 operates in conjunction with the application 212 to perform field recalibration of the display device 215. For example, the field recalibration module 246 may transmit control signals to the input device 205 and/or the visual sensor 250 that coordinate a timing of displaying the one or more test patterns and acquiring the one or more images 254, so that each of the one or more test patterns are imaged.

In some embodiments, the test pattern data 226 is predefined in the input device (as shown, within the NVM 220), and the field recalibration module 246 transmits a first control signal to the input device 205 (via communicative link 252) and a second control signal to the visual sensor 250

(via communicative link 256) that control the relative timing of displaying the one or more test patterns and acquiring the one or more images 254. In some embodiments, the first control signal also configures the input device 205 to operate the display device 215 in a default configuration or other specified configuration. For example, the first control signal may instruct the input device 205 to disable application of the (factory-set or other previously set) mura compensation data, to disable one or more other graphics settings, to apply a specified gamma value, and so forth.

In other embodiments, the test pattern data 226 need not be stored in the NVM 220. For example, the field recalibration module 246 may also transmit the test pattern data 226 to the input device 205 with one or more control signals, such that it need not be stored in the NVM 220 (e.g., the test pattern data 226 may be written to a random-access memory of the memory 210 that is accessed by the application 212).

The one or more images 254 are acquired responsive to transmitting the second control signal to the visual sensor 250. In some embodiments, the field recalibration module 246 performs analysis on the one or more images 254 to detect mura therein. For example, the field recalibration module 246 may be configured to detect one or more predefined different types of mura, such as line defects, particle defects, color edge mura, polarizer deformation, black mura, blob analysis, butterfly mura, corner light, diagonal line mura, edge mura, LED mura, line mura, random mura, spot mura, and so forth. The field recalibration module 246 may be further configured to adjust the one or more images 254 based on the presence of a protective film or glass attached to the display device 215.

Responsive to detecting mura in the one or more images 254, the field recalibration module 246 generates field-set gamma data and/or the field-set mura compensation data based on the one or more images 254. The field-set mura compensation data is applied by the processing system 218 to mitigate some or all of the detected mura. For example, the field-set mura compensation data may be generated to specifically mitigate one or more different types of mura that are detected in the one or more images 254. The field recalibration module 246 transmits the field-set gamma data and/or field-set mura compensation data to the host processor 206. The field-set gamma data and/or field-set mura compensation data may be transmitted in a compressed or in an uncompressed format.

In some embodiments, the host processor 206 communicates with the processing system 218 to write the field-set gamma data and/or the field-set mura compensation data into the NVM 220. In some embodiments, when the field-set gamma data and/or the field-set mura compensation data replaces the factory-set gamma data and/or the factory-set mura compensation data in the NVM 220, the host processor 206 and/or the processing system 218 writes a backup copy of the factory-set gamma data and/or the factory-set mura compensation data into a memory external to the display driver circuitry 228 (e.g., the memory 210). In other embodiments, the field-set gamma data and/or the field-set mura compensation data is stored along with the factory-set gamma data and/or the factory-set mura compensation data in the NVM 220. In this way, the factory-set gamma data and/or the factory-set mura compensation data may remain available in the case that the field-set gamma data and/or the field-set mura compensation data is lost or corrupted.

In some embodiments, the field-set gamma data and/or the field-set mura compensation data is written into the NVM 220 upon receipt from the computing device 240, without requiring further input(s) from the field recalibration module 246 and/or from an end-user of the input device 205.

In other embodiments, the field-set gamma data and/or the field-set mura compensation data is written into the NVM 220 responsive to one or more inputs. For example, the field-set gamma data and/or the field-set mura compensation data may be written into a random access memory (RAM) of the memory 210. The host processor 206 may then generate one or more images as if the field-set gamma data and/or the field-set mura compensation data had been written into the NVM 220, and the display device 215 displays the one or more generated images.

In some cases, an input is received by the field recalibration module 246 to "accept" or "confirm" the field-set mura compensation data provided by the field recalibration module 246. For example, one or more additional images of the plurality of pixels 216 are acquired when the one or more generated images are displayed by the display device 215. In this case, the one or more generated images may correspond to one of the one or more test patterns that were previously displayed. The field recalibration module 246 performs analysis on the one or more additional images to detect whether the mura that had been detected in the one or more images 254 has been suitably mitigated (e.g., eliminated or reduced below a suitable threshold). If the mura has been suitably mitigated, the field recalibration module 246 "accepts" the field-set mura compensation data, and transmits a control signal to the input device 205 to cause the field-set mura compensation data to be written into the NVM 220. If the mura has not been suitably mitigated, the field recalibration module 246 may recalculate or otherwise update the field-set mura compensation data.

In other cases, an input is received from an end-user to accept or confirm the field-set mura compensation data. For example, the host processor 206 may generate one or more graphical elements for displaying a user interface (UI) using the display device 215. An end-user of the input device 205 may provide an input via the UI to accept or confirm the field-set mura compensation data, or to indicate to the field recalibration module 246 to recalculate or otherwise update the field-set mura compensation data. In another example, the one or more processors 242 may generate one or more graphical elements for displaying a user interface (UI) using the computing device 240. An end-user of the computing device 240 may provide an input via the UI to accept or confirm the field-set mura compensation data, or to indicate to the field recalibration module 246 to recalculate or otherwise update the field-set mura compensation data.

In some embodiments, the field-set mura compensation data may be selectively applied to the plurality of pixels 216, such that the field-set mura compensation data is used for at least a first region of the display device 215, and the factory-set mura compensation data (or a previous field-set mura compensation data) is used for at least a second region of the display device 215. For example, an end-user may be interested in removing ghost images from the plurality of pixels 216, but is indifferent to other variations in the luminance across the plurality of pixels 216. In this case, input from the end-user may indicate the first region (e.g., where the ghost images are displayed). The host processor 206 may calculate a composite field-set mura compensation data, in which the field-set mura compensation data is applied to the first region, and the factory-set mura compensation data (or the previous field-set mura compensation data) is used for the second region. The composite field-set mura compensation data may be written to the NVM 220.

Figure 5:
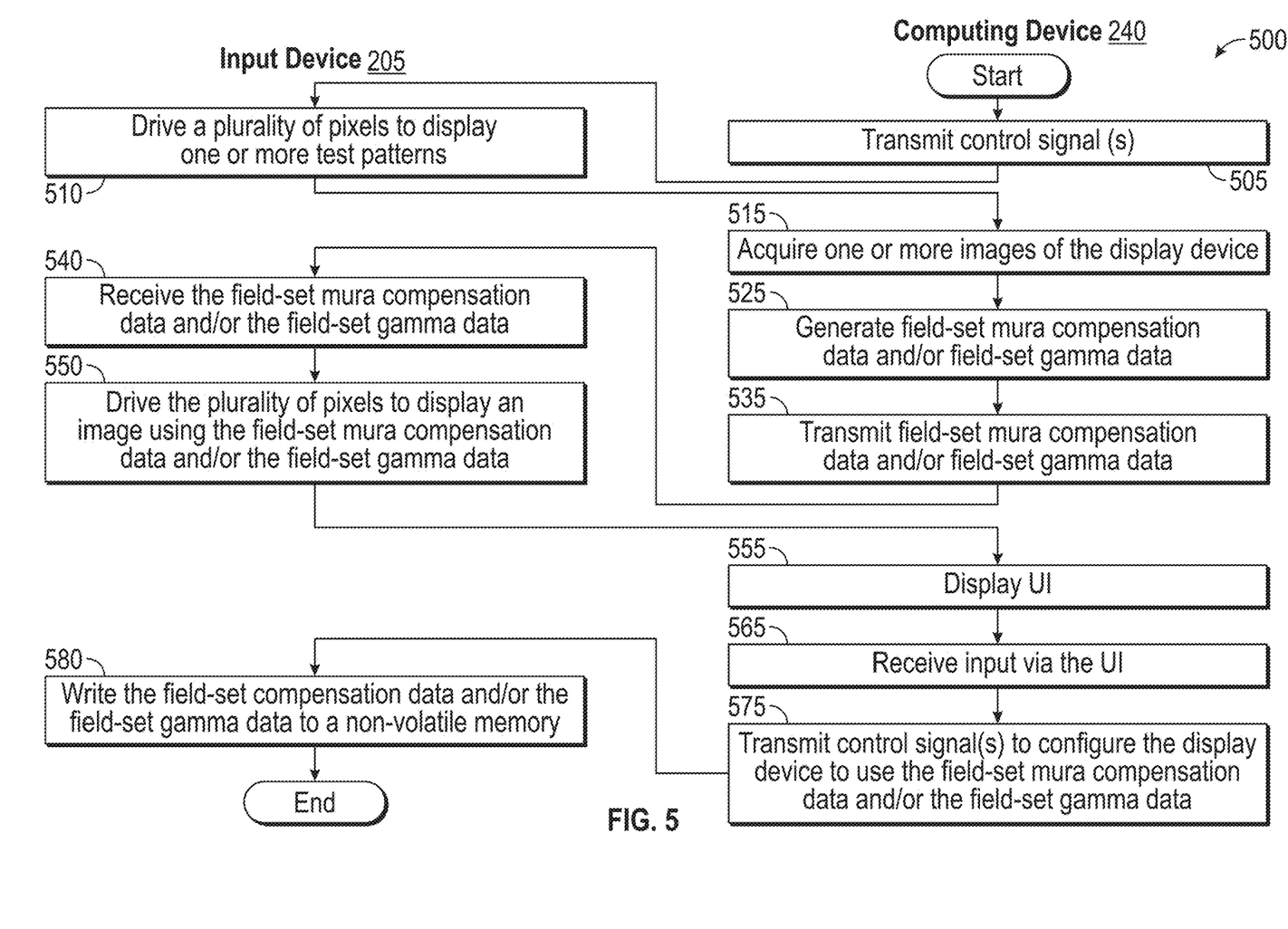
FIG. 5 is a method of field calibration of a display device, according to embodiments described herein.

FIG. 5 is a method 500 of field calibration of a display device, according to embodiments described herein. The method 500 may be performed in conjunction with other embodiments, e.g., using features of the system 200 of FIG. 2.

Method 500 begins at block 505, where the computing device 240 transmits one or more control signals. In some embodiments, the one or more control signals include at least a first control signal to the input device 205, and at least a second control signal to the visual sensor 250. In some embodiments, the one or more control signals may include test pattern data that is used to display one or more test patterns using the display device 215. In some embodiments, the one or more control signals may configure the input device 205 to operate the display device 215 in a default configuration or other specified configuration (which may include disable application of the mura compensation data or other graphics settings).

In some embodiments, the first control signal also configures the input device 205 to operate the display device 215 in a default configuration or other specified configuration. For example, the first control signal may instruct the input device 205 to disable application of the (factory-set or other previously set) mura compensation data, to disable one or more other graphics settings, to apply a specified gamma value, and so forth.

At block 510, the input device 205 drives a plurality of pixels to display one or more test patterns. At block 515, the computing device 240 acquires one or more images of the display device 215. In some embodiments, a field recalibration module 246 of the computing device 240 coordinates timing of driving the plurality of pixels and the acquiring one or more images, so that each of the one or more test patterns are imaged.

At block 525, the computing device 240 generates field-set mura compensation data and/or field-set gamma data based on the one or more images. In some embodiments, the field recalibration module 246 performs analysis on the one or more images 254 to detect mura therein. At block 535, the computing device 240 transmits the field-set mura compensation data and/or the field-set gamma data to the input device 205.

At block 540, the input device 205 receives the field-set mura compensation data and/or the field-set gamma data. At block 550, the input device 205 drives the plurality of pixels to display an image using the field-set mura compensation data and/or the field-set gamma data.

At block 555, the computing device 240 displays a user interface (UI). At block 565, the computing device 240 receives an input via the UI. At block 575, the computing device 240 transmits one or more control signals to configure the display device 215 to use the field-set mura compensation data and/or the field-set gamma data.

At block 580, the input device 205 writes the field-set mura compensation data and/or the field-set gamma data to a NVM 220 of the processing system 218. In some embodiments, the field-set gamma data and/or the field-set mura compensation data replaces the factory-set gamma data and/or the factory-set mura compensation data in the NVM 220. In these embodiments, a backup copy of the factory-set gamma data and/or the factory-set mura compensation data may be written into a memory external to the display driver circuitry 228. In other embodiments, the field-set gamma data and/or the field-set mura compensation data is stored along with the factory-set gamma data and/or the factory-set mura compensation data in the NVM 220.

In some embodiments, block 580 is responsive to the control signal(s) transmitted by the computing device 240 at block 575. In alternate embodiments, block 580 follows receiving the field-set mura compensation data and/or the field-set compensation data at block 540, e.g., without requiring further input(s). Method 500 ends following completion of block 580.

Figure 6:
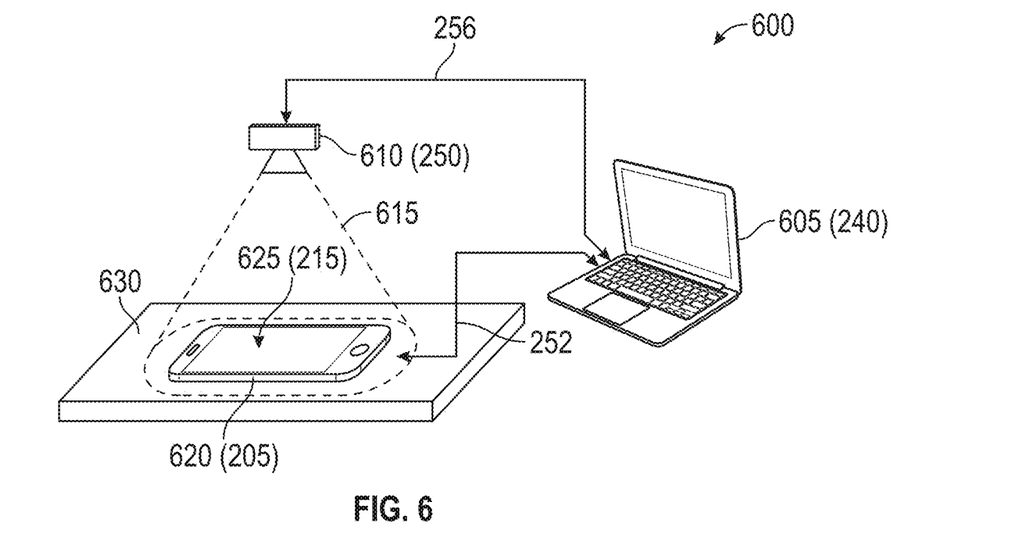
FIG. 6 illustrates an exemplary workstation for field calibration of a display device, according to embodiments described herein.

FIG. 6 illustrates an exemplary workstation 600 for field calibration of a display device, according to embodiments described herein. The features illustrated in FIG. 6 may be used in conjunction with other embodiments. For example, the workstation 600 represents one example implementation of the system 200 of FIG. 2.

The workstation 600 comprises a surface 630 on which a mobile computing device 620 (one example of the input device 205) is removably placed. The mobile computing device 620 is arranged such that a display 625 (one example of the display device 215) faces upward. The surface 630 may be planar or any other shape suitable for arranging the mobile computing device 620 for imaging the display 625. Further, the surface 630 may include fiducial features or markers that assist with image processing of the images of the display 625.

The workstation 600 further comprises an overhead camera 610 (one example of the visual sensor 250) having a field of view 615 and having a predefined orientation relative to the surface 630. The overhead camera 610 may be attached with the surface 630, e.g., via a mounting arm. In some embodiments, the overhead camera 610 is in a fixed arrangement with the surface 630. In other embodiments, the overhead camera 610 is in a movable arrangement with the surface 630 (e.g., an articulating mounting arm).

A laptop computer 605 (one example of the computing device 240) is coupled with the overhead camera 610 via the communicative link 256, and is coupled with the mobile computing device 620 via the communicative link 252. In some embodiments, the laptop computer 605 includes the field recalibration module 246 of FIG. 2 and transmit control signals to the laptop computer 605 and the overhead camera 610 that coordinate a timing of displaying one or more test patterns and acquiring one or more images. The laptop computer 605 further analyzes the one or more images to detect mura therein, and generates at least the field-set mura compensation data. The laptop computer 605 transmits the field-set mura compensation data to the mobile computing device 620 via the communicative link 252.

Figure 7:
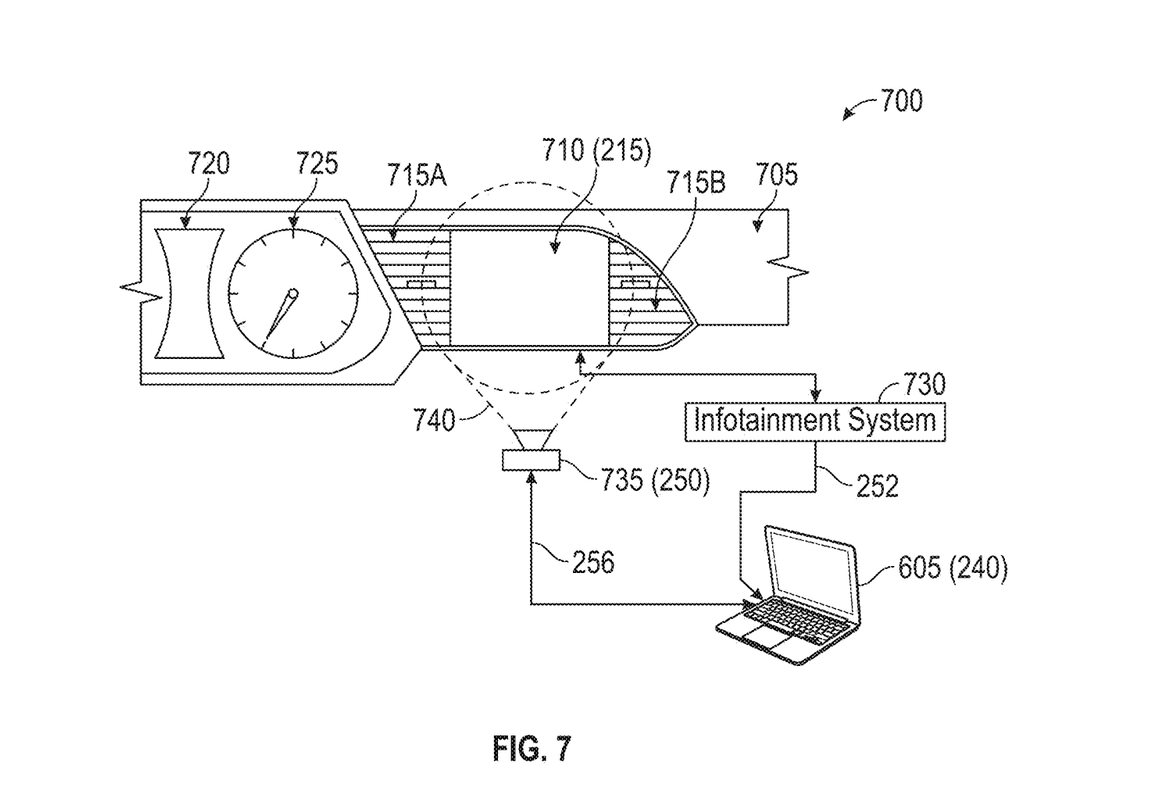
FIG. 7 illustrates field calibration of a vehicle-based display device, according to embodiments described herein.

FIG. 7 illustrates field calibration of a vehicle-based display device, according to embodiments described herein. The features illustrated in FIG. 7 may be used in conjunction with other embodiments. For example, diagram 700 represents one example implementation of the system 200 of FIG. 2.

The diagram 700 illustrates a portion of a dashboard 705 of a vehicle. The dashboard 705 includes one or more indicators in a region 720 and a gauge 725 that communicate information to a driver of the vehicle. A display 710 (one example of the display device 215) is arranged between air vents 715A, 715B defined in the dashboard 705. In some embodiments, the display 710 is a touch-enabled display, e.g., including an overlay of transparent touch sensing electrodes. In some embodiments, the display 710 is included in an infotainment system 730 that also includes one or more processors and a memory. The infotainment system 730 provides any suitable functionality, such as vehicle operational information, navigation, media playback, phone and/or text communications, and so forth. The infotainment system 730 is communicatively coupled with the laptop computer 605 using the communicative link 252.

A portable camera 735 (one example of the visual sensor 250) has a field of view 740. The portable camera 735 is coupled with the laptop computer 605 via the communicative link 256. In some embodiments, the portable camera 735 is hand-held to acquire the one or more images of the display 710. In other embodiments, the portable camera 735 is attached to a mount and coupled with a component of the vehicle. For example, the portable camera 735 may be attached to a tripod and positioned on a center console armrest of the vehicle, such that the field of view 740 overlaps the display 710.

Figure 8:
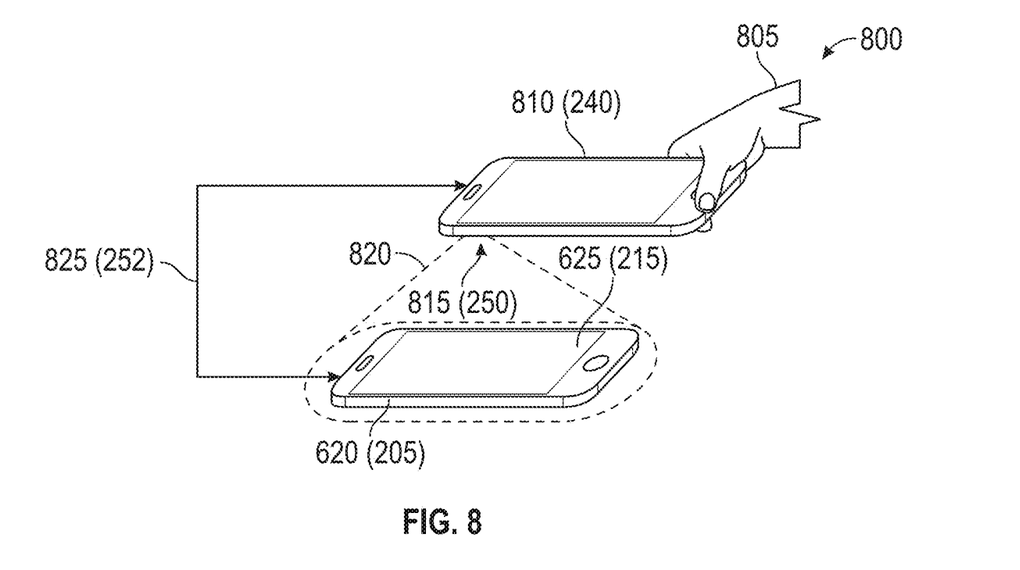
FIG. 8 illustrates field calibration using a mobile computing device, according to embodiments described herein.

FIG. 8 illustrates field calibration using a mobile computing device, according to embodiments described herein. The features illustrated in FIG. 8 may be used in conjunction with other embodiments. For example, diagram 800 represents one example implementation of the system 200 of FIG. 2.

The diagram 800 illustrates a mobile computing device 810 (one example of the computing device 240) operated by a technician 805. A camera 815 (one example of the visual sensor 250) of the mobile computing device 810 has a field of view 820. The mobile computing device 810 is coupled with the mobile computing device 620 via a wireless communicative link 825 (one example of the communicative link 252).

Figure 9:
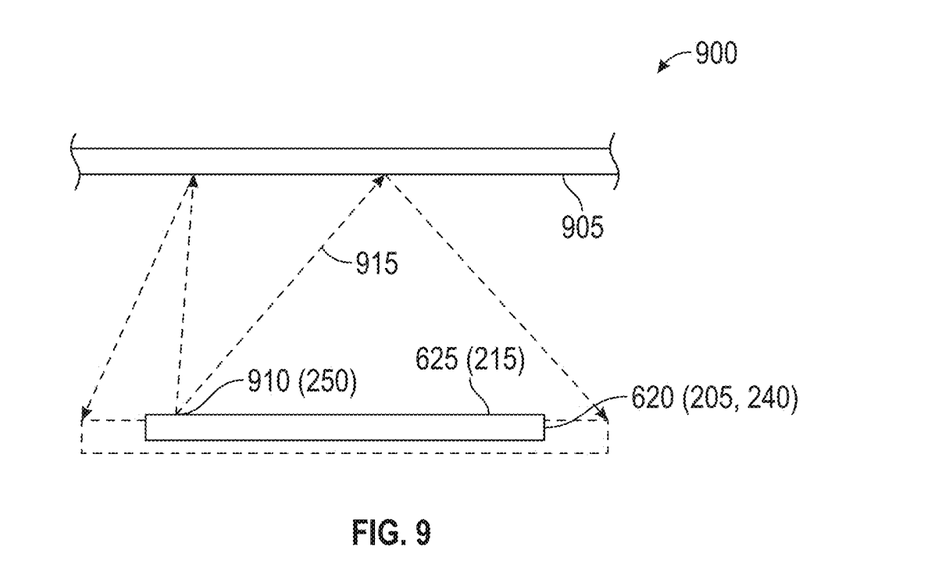
FIG. 9 illustrates field calibration using a reflective surface, according to embodiments described herein.

FIG. 9 illustrates field calibration using a reflective surface, according to embodiments described herein. The features illustrated in FIG. 9 may be used in conjunction with other embodiments. For example, diagram 900 represents one example implementation of the system 200 of FIG. 2.

The diagram 900 illustrates the display 625 facing a reflective surface 905 such as a mirror. The reflective surface 905 is shown as planar but may have any desired profile, such as concave or convex. The mobile computing device 620 further comprises a front-facing camera 910 on the same side as the display 625. The front-facing camera 910 has a field of view 915 that is redirected using the reflective surface 905 to include the display 625.

The front-facing camera 910 acquires one or more images responsive to one or more test patterns displayed on the display 625. The mobile computing device 620 may perform image processing of the one or more images, e.g., to mitigate distortion introduced by the reflective surface 905. In some embodiments, the mobile computing device 620 analyzes the one or more acquired images to detect mura therein, and generates at least the field-set mura compensation data. In these embodiments, the mobile computing device 620 includes the functionality of both the input device 205 and the computing device 240. However, in other embodiments, the mobile computing device 620 may communicate the one or more acquired images or the detected mura information to an external computing device, which generates the field-set mura compensation data and transmits the field-set mura compensation data back to the mobile computing device 620.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

What is claimed is:

1. A processing system for a display having an active area defined by a plurality of pixels, the processing system comprising:
   a non-volatile memory configured to store factory-set mura compensation data for the display; and
   display driver circuitry configured to:
      receive one or more control signals via a communicative link with an external processor that is external to the processing system;
      drive the plurality of pixels to display one or more test patterns in accordance with timing specified by the one or more control signals;
      receive, from the external processor, field-set mura compensation data for the plurality of pixels, the field-set mura compensation data based on one or more images of the plurality of pixels that are acquired responsive to displaying the one or more test patterns;
   wherein the processing system is configured to:
      receive an input via a user interface (UI) provided in the active area configured to display the UI and a touch interface in the active area configured to receive the input;
      responsive to receiving the input, write the field-set mura compensation data into the non-volatile memory; and
      drive, by the display driver circuitry, the plurality of pixels to display an image using the field-set mura compensation data instead of using the factory-set mura compensation data.

2. The processing system of claim 1, wherein the display comprises an organic light-emitting diode (OLED) display.

3. The processing system of claim 1, wherein the display driver circuitry is further configured to:
   write field-set gamma data into the non-volatile memory, the field-set gamma data based on the one or more images that are acquired responsive to displaying the one or more test patterns.

4. The processing system of claim 1, wherein the display driver circuitry is further configured to:
   receive the one or more test patterns from the external processor.

5. The processing system of claim 1, further comprising:
   touch sensing circuitry configured to operate a plurality of sensor electrodes to acquire capacitive sensing data for the touch interface.

6. The processing system of claim 5, wherein the plurality of sensor electrodes comprises display electrodes that are coupled with the plurality of pixels.

7. The processing system of claim 5, further comprising:
   optical sensing circuitry configured to acquire optical sensing data from one or more optical sensing elements coupled with one or more sensor electrodes of the plurality of sensor electrodes.

8. A method comprising:
   driving, using display circuitry, a plurality of pixels defining an active area of a display device to display one or more test patterns;
   receiving field-set mura compensation data that is based on one or more images of the plurality of pixels, the one or more images acquired responsive to displaying the one or more test patterns;
   driving the plurality of pixels to display a user interface (UI) in the active area;

receiving an input via the UI by a touch interface in the active area;

responsive to receiving the input, writing the field-set mura compensation data to a memory of the display device, wherein the field-set mura compensation data replaces factory-set mura compensation data; and writing a backup copy of the factory-set mura compensation data into a memory external to the display circuitry.

9. The method of claim 8, further comprising:

driving the plurality of pixels to display an image using the field-set mura compensation data.

10. The method of claim 8, wherein the input configures the display circuitry to use the field-set mura compensation data for at least a first region of the display device, and wherein the display circuitry is further configured to, for at least a second region of the display device, use the factory-set mura compensation data or a previous field-set mura compensation data.

11. The method of claim 8, further comprising:

receiving, from a processor external to the display circuitry, one or more of:
  the field-set mura compensation data;
  the one or more test patterns; and
  field-set gamma data based on the one or more images that are acquired responsive to displaying the one or more test patterns.

12. The method of claim 8, wherein the display circuitry is included in a processing system that further comprises touch sensing circuitry configured to operate a plurality of sensor electrodes to acquire capacitive sensing data for the touch interface.

13. The method of claim 8, wherein the display device is integrated into a manufactured input device.

14. The method of claim 8, further comprising:

determining that the field-set mura compensation data is lost or corrupted; and writing the backup copy of the factory-set mura compensation data to the memory of the input device.

15. A method comprising:

transmitting, from an external processor that is external to a manufactured input device, one or more control signals that configure the input device to display one or more test patterns using a display device integrated into the input device, wherein the display device drives a plurality of pixels defining an active area of the display device to display the one or more test patterns in accordance with timing specified by the one or more control signals;

acquiring, using a visual sensor coupled with the external processor, one or more images of the display device responsive to displaying the one or more test patterns;

generating field-set mura compensation data that is based on the acquired one or more images;

transmitting the field-set mura compensation data to the input device;

driving the plurality of pixels to display a user interface (UI) in the active area;

receiving an input via the UI by a touch interface in the active area; and responsive to receiving the input, transmitting a control signal to configure the display device to use the field-set mura compensation data.

16. The method of claim 15, wherein generating and transmitting the field-set mura compensation data is performed using an external computing device that is communicatively coupled with the input device via one or both of a wired link and a wireless link.

17. The method of claim 16, wherein the visual sensor is external to the external computing device.

18. The method of claim 15, wherein generating and transmitting the field-set mura compensation data is performed using a host processor of the input device.

19. The method of claim 15, further comprising:

adjusting the one or more images responsive to determining a presence of a protective film or glass attached to the display device, wherein generating the field-set mura compensation data is based on the adjusted one or more images.

20. The method of claim 15, further comprising:

detecting a plurality of predefined types of mura in the one or more images, wherein the field-set mura compensation data is generated to mitigate fewer than all of the plurality of predefined types.

* * * * *